United States Patent [19]

Kosseim et al.

[11] 4,170,628

[45] Oct. 9, 1979

[54] PROCESS FOR REMOVING SO₂ FROM EFFLUENT GASES AND FOR REMOVING HEAT STABLE SALTS FROM SYSTEMS IN WHICH THEY ACCUMULATE USING AN ANION EXCHANGE RESIN

[75] Inventors: Alexander J. Kosseim, Yorktown Heights; David A. Dunnery, New York; Gilbert R. Atwood, Briarcliff Manor, all of N.Y.

[73] Assignee: Union Carbide Corporation, New York, N.Y.

[21] Appl. No.: 910,521

[22] Filed: May 30, 1978

Related U.S. Application Data

[63] Continuation of Ser. No. 781,166, Mar. 25, 1977, abandoned.

[51] Int. Cl.² ................................................ C01B 17/00
[52] U.S. Cl. ................................... 423/243; 423/242
[58] Field of Search ............... 423/242, 243, 244, 514, 423/515

[56] References Cited

U.S. PATENT DOCUMENTS

| | | | |
|---|---|---|---|
| 1,639,905 | 8/1927 | Sperr et al. | 423/514 |
| 2,713,077 | 7/1955 | Reeve | 423/244 X |
| 3,330,621 | 7/1967 | Vian-Ortuno et al. | 423/244 X |
| 3,896,214 | 7/1975 | Newman | 423/242 |
| 3,904,735 | 9/1975 | Atwood et al. | 423/243 |
| 4,071,602 | 1/1978 | Pearce | 423/243 |

FOREIGN PATENT DOCUMENTS 164543 8/1955 Austria ....................................... 423/514

*Primary Examiner*—O. R. Vertiz
*Assistant Examiner*—Gregory A. Heller
*Attorney, Agent, or Firm*—Dominic J. Terminello

[57] ABSTRACT

Improvement in processes for the selective removal of sulfur dioxide with respect to carbon dioxide from a gas mixture containing same wherein the gas mixture is contacted with an aqueous absorbent solution, such as alkanolamine, alkali metal hydroxide, ammonium hydroxide or sulfites thereof, to remove sulfur dioxide from the gas mixture and form a $SO_2$-rich aqueous absorbent solution which is moved to a stripping zone where sulfur dioxide is driven off to form a $SO_2$-depleted aqueous absorbent solution which is recycled and re-contacted with the gas mixture, the improvement comprising removing sulfur oxyanions of heat stable salts which accumulate in the aqueous absorbent solution by contacting a portion of it with an anion exchange resin having hydroxyl anions displaceable by the heat stable sulfur oxyanions whereby the hydroxyl anions of the resin are replaced by the heat stable divalent sulfur oxyanions which are thus taken out of the solution. The anion exchange resin preferably is a strong base anion exchange resin which can be regenerated by contacting it with aqueous sodium hydroxide to replace the heat stable sulfur oxyanions on said resin with hydroxyl anions.

19 Claims, 4 Drawing Figures

PROCESS FOR REMOVING SO₂ FROM EFFLUENT GASES AND FOR REMOVING HEAT STABLE SALTS FROM SYSTEMS IN WHICH THEY ACCUMULATE USING AN ANION EXCHANGE RESIN

This application is a continuation of our prior U.S. application Ser. No. 781,166, filed Mar. 25, 1977, now abandoned.

BACKGROUND OF THE INVENTION

1. Field of the Invention

This invention relates to novel processes for removing sulfur oxides from gas mixtures containing same as in the removal of sulfur oxides from combustion waste gases, or stack gases of electric power plants, pyrites roasting processes, smelters, sulfuric acid plants, off-gases from incinerators, and off-gases from other chemical procedures. More generally, the invention relates to the removal of heat stable salts containing heat stable, divalent, sulfur oxyanions from systems in which they accumulate.

2. Description of the Prior Art

The United States and the world at large are currently faced with conflicting crises of the shortage of energy or clean-burning fuels on the one hand and ever-increasing environmental pollution on the other. The energy crisis could be largely eliminated if it were possible to burn the abundance of high sulfur coal or other high sulfur fuels available in this country. Many attempts have been made to develop power plant stack gas clean-up processes so that this could be done but with little technical and economic success.

Many proposed processes react the sulfur dioxide ($SO_2$) with limestone or other inorganics. Because of the inefficiencies of these reactions, the reagents are used in greater than stoichiometric amounts, and greater than stoichiometric quantities of waste solids or liquids are produced, presenting an additional disposal and secondary pollution problem. In addition, the reaction inefficiencies permit large quantities of the $SO_2$ to go out the stack anyway.

Attempts have been made to absorb the $SO_2$ in regenerable type solvents (see, for example, U.S. Pat. No. 1,908,731). These processes, too, have been plagued with inefficiencies, typified by poor $SO_2$ pick-up, extremely high stripping steam requirements, and side reactions such as $SO_2$ oxidation and disproportionation. The latter lead to non-volatile or heat stable sulfur oxygen anions, tying up the solvent and diminishing its capacity so that a large purge stream must be taken for discard or chemical reclaiming.

Among the solutions proposed for this problem are those which involve absorbing and/or reacting the sulfur oxides with inorganic reagents, e.g., sodium carbonate, sodium hydroxide, ammonium hydroxide, aqueous ammonia, other alkali metal or alkaline earth metal hydroxides or carbonates and the like, in solution, slurry or powder form to yield the corresponding sulfate and sulfite salts.

In many of these processes, the absorbing solutions are regenerated by heating, in a separate vessel, thus liberating concentrated $SO_2$. This desorption step does not, however, remove any sulfate, thiosulfates or polythionates that result from absorption of the sulfur trioxide and thermal disproportionation of sulfite and bisulfite and which eventually build up in the system.

In many of these previously proposed solutions, the reagent cannot be readily regenerated without the expenditure of considerable amounts of energy or considerable amounts of other reagents. In those instances where a regenerated absorbent can be used, the sulfate concentration in the absorbent builds up both by absorption of sulfur trioxide or sulfuric acid mist which might be and usually are present in the stack gas and by oxidation of dissolved sulfur dioxide by the reaction of oxygen which is also sometimes present in the stack gas. A further source of the build up of sulfates or other sulfur oxyanions of heat stable salts is by disproportionation of dissolved sulfites and bisulfites. Such heat stable salts include, in addition to the sulfates, $SO_4^=$; the thiosulfates, $S_2O_3^=$; the dithionates, $S_2O_6^=$; the trithionates, $S_3O_6^=$; other higher polythionates, $S_xO_6^=$, and other divalent sulfur oxyanion-containing heat stable salts. The sulfates usually can be removed essentially quantitatively through the use of an alkali metal hydroxide equivalent to twice the molar concentration of the sulfate resulting in substantial quantitative precipitation of the sulfate as the di-alkali metal salt without precipitation of sulfite or bisulfite ions. However, the other divalent sulfur oxyanions of strong acids such as the thiosulfates, dithionates and higher polythionates also build up in the system and cannot be quantitatively removed by means of alkali metal hydroxide precipitation. Furthermore, the presence of such other divalent sulfur oxyanions of heat stable salts actively interfere with the quantitative removal of the sulfates.

In some instances, as in U.S. Pat. No. 3,503,185, the combustion waste gas was prewashed to remove sulfates which were then purged from the system. Such prewashes were not capable of removing all sulfur trioxide as sulfate and, of course, would not remove sulfates formed in other parts of the system. This patent, furthermore, does not disclose any means for eliminating the thiosulfates, dithionates and higher polythionates. U.S. Pat. No. 3,790,660 is similar in showing a water prewash to remove sulfur trioxide and fly ash. It specifies a sulfate purge stream to remove the sulfate; unfortunately, a considerable amount of the alkali metal sulfite and bisulfite also accompany the sulfate. This requires a considerable addition of alkali metal hydroxide to make up for the loss. Furthermore, there is no system disclosed for removing the thiosulfates, dithionates or other polythionates except by purging them with the sulfate in a waste stream. The waste stream itself is relatively dilute and poses a problem in disposing of the waste stream which is difficult and expensive to handle.

There are prior processes which utilize $H_2S$, itself a noxious gas, to react with sulfur oxides which are dissolved in solvents, such as alkali metal bisulfites, ammonium bisulfite, aqueous ammonia or ammonium sulfite. These prior processes are disclosed in U.S. Pat. Nos. 3,561,925; 3,598,529; 3,719,742; 3,833,710; 3,839,549, and 3,883,638. All but the last of these patents fail to specifically address the problem of removing sulfates and other heat stable salts which build up or accumulate during removal of sulfur dioxide. Furthermore, $H_2S$ in some cases is not readily available and can be difficult to store and handle and can itself possibly lead to pollution problems.

The use of alkanolamines, such as trialkanolamines, has been found to be a highly efficient way of absorbing sulfur dioxide from waste gases in a cycle in which the alkanolamine solvent contacts the waste gas to absorb the sulfur oxides and is thereafter stripped by heat to release the sulfur dioxide as a gas whereupon it is collected for safe disposal. The stripped alkanolamine is then recycled back to the absorber for further contact with incoming waste gases and further absorption of sulfur oxide. This type of system is disclosed in U.S. Pat. Nos. 3,620,674 and 3,904,735. Heat stable salts, such as those mentioned hereinabove, accumulate in the recycling absorbent to a troublesome extent and must be removed in order to maintain the absorbing capability of the absorbent. The latter patent does disclose a sulfate purge cycle in which a portion of the lean absorbent is treated with potassium hydroxide or potassium carbonate to precipitate out the sulfate as potassium sulfate. While this type of purge system is quite effective in removing sulfates, it is severely limited in removing other heat stable salts or their divalent sulfur oxyanions, which also seem to interfere, however, with the sulfate removal. Furthermore, large amounts of wet sulfates are produced and create a severe disposal problem. There does not appear to be any provisions made in U.S. Pat. No. 3,620,674 for removing the heat stable salts and/or their sulfur oxyanions from the absorbent which gradually but inevitably loses effectiveness because of the accumulation of heat stable salts therein.

Anion exchange resins have been used in the past to separate sulfur dioxide from waste gas mixtures. An example of prior art of this type is U.S. Pat. No. 3,330,621 which utilizes a mass of solid pyridine group-containing particles to contact the sulfur dioxide-containing gas to bind the sulfur dioxide as sulfite groups to the pyridine groups. Thereafter, oxygen is added to oxidize the sulfite groups on the pyridine groups to form sulfate groups. Then, the sulfate groups on the pyridine groups are treated with ammonia to form ammonium sulfate which is then recovered and the pyridine group-containing particles are recycled for re-contact with the waste gases. This type of prior art process involves the use of extremely high quantities of anion exchange resin and excessively large quantities of ammonia and/or other reagents and presents a disposal problem for the large quantities of ammonium sulfate which are produced because the total quantity of sulfur dioxide in the waste gas is converted via the pyridine group-containing particles into ammonium sulfate.

Anion exchange resins have also been used to treat the total amount of a recycling absorbent, such as sodium hydroxide or ammonium bisulfite. In U.S. Pat. No. 3,896,214, the sulfur dioxide and sulfur trioxide in the waste gases are washed with sodium hydroxide to convert substantially all the sulfur dioxide and sulfur trioxide content thereof into sodium bisulfite and/or sodium sulfite and sodium sulfate which are then contacted with a hydroxyl-containing weak base or strong base anion exchange resin to substitute the hydroxyl groups on the resin with the bisulfite, sulfite and sulfate anions thereby regenerating the sodium hydroxide. The resulting resin sulfate, sulfite and/or bisulfite is regenerated by treatment with aqueous lime hydrate to form calcium sulfate and calcium sulfite and/or calcium bisulfite and to substitute hydroxyl anions on the resin. The calcium salts are removed as a sludge by dewatering. In U.S. Pat. No. 3,833,710, aqueous ammonium sulfite is used as an absorbent and is converted to aqueous ammonium bisulfite after picking up the sulfur dioxide in the waste gas. The aqueous ammonium bisulfite solution is contacted with a weak base anion exchange resin in the hydroxyl form to convert the resin to the bisulfite form and regenerate the ammonium sulfite absorbent solution. Both this and U.S. Pat. No. 3,896,214 are based on the removal from the waste gases of the total amount of the $SO_2$ content as well as the $SO_3$ content by utilizing ion exchange. This requires the utilization of extremely large amounts of anion exchange resins which are expensive and also requires the use of extremely large amounts of reagents to regenerate the anion exchange resin which is not only expensive but presents a considerable waste disposal problem for liquid waste that are relatively quite dilute when consideration is given to the need for washing the resin after each liquid pass during regeneration.

U.S. Pat. No. 2,713,077 discloses the use of strong base anion exchange resins to remove carbonyl sulfides from hydrocarbon fluids, such as hydrocarbon gases, produced by the thermal or catalytic cracking of petroleum oils or by the reaction of steam with coke or hydrocarbons. U.S. Pat. No. 3,297,401 removes arsenic and iron contamination from phosphoric acid preparations with a weak base liquid anion exchange resin. In each of these patents the spent anion exchange resin can be regenerated with sodium hydroxide. Neither patent relates to the removal of sulfur dioxide and heat stable salts from waste gases containing them or their ingredients.

SUMMARY OF THE INVENTION

The present invention provides improvements in processes designed for the selective removal of sulfur dioxide with respect to carbon dioxide from a gas mixture containing same wherein
  (a) the gas mixture is contacted with an aqueous absorbent solution containing as an absorbent alkanolamine, alkali metal hydroxides, ammonium hydroxide and/or sulfites thereof to remove sulfur dioxide from said gas mixture and form a rich aqueous absorbent solution enriched in sulfur dioxide removed from the gas mixture,
  (b) the rich aqueous absorbent solution is moved to a stripping zone where sulfur dioxide is removed to form a lean aqueous absorbent solution depleted in sulfur dioxide content, and
  (c) the lean aqueous absorbent solution is recycled and re-contacted with said gas mixture.

Processes of this type to which the improvements of this invention can be adapted are known in the art and are illustrated by U.S. Pat. Nos. 3,904,735 incorporated herein by reference and 3,620,674 which describe processes utilizing alkanolamines or sulfites thereof as absorbents; U.S. Pat. Nos. 3,790,660 and 3,719,742 which respectively use sodium sulfite and potassium sulfite; U.S. Pat. No. 3,833,710 which uses ammonium sulfite; U.S. Pat. Nos. 3,503,185, 3,561,925, 3,839,549 and 3,883,638 which use aqueous ammonia or ammonium hydroxide; and U.S. Pat. No. 3,896,214 which uses sodium hydroxide as absorbent.

It is important to use those operating conditions that restrain $SO_2$ oxidation, $SO_2$ disproportionation, and solvent degradation. These include, for example, limiting the temperature of absorption and stripping to 125° C. or less and maintaining in the solvent at least one mol of water for every mol of $SO_2$ absorbed. It is recognized, too, that even under such constraints there could be some $SO_2$ oxidation to produce the heat stable sulfate ion. In addition, it is realized that some $SO_3$ exists in the stack gas as such, and would be simultaneously absorbed along with the $SO_2$ to give additional sulfate ion.

It has been previously proposed to remove the sulfate ion by potassium ion precipitation (see U.S. Pat. No. 3,904,735). Whereas this is an excellent step in the situation wherein the major heat stable salt is the sulfate (as it would certainly be if the process were used to treat sulfuric acid tail gas containing large quantities of $SO_3$), in many other circumstances this is not the case. The effective choice of solvent and operating conditions reduces oxidation to very low levels and, if there is little $SO_3$ in the stack gas, sulfate is no longer the major heat stable anion. Instead, the products of $SO_2$ disproportionation and other side reactions make up the bulk of the heat stable anions and these include, in addition to sulfate, thiosulfate, dithionate, trithionate and other species. The previously proposed alkali metal precipitation techniques are not sufficiently effective against these other heat stable salts and a need existed for improvement.

The improvement of this invention relates to the removal of divalent sulfur oxyanions of heat stable salts which accumulate in the aqueous absorbent solution, and comprises the step of contacting a small portion of the lean aqueous absorbent solution as a slip or purge stream with an anion exchange resin having hydroxyl anions displaceable by the divalent sulfur oxyanions of the heat stable salts to remove same from the lean aqueous absorbent solution whereby the hydroxyl anions of the resin are replaced by the divalent sulfur oxyanions of the heat stable salts. The heat stable salts (collectively designated HSS) exist in the absorbent primarily in the dinegative anionic forms $SO_4^=$, $S_2O_3^=$, $S_2O_6^=$, etc., and are collectively designated as $HSS^=$. The present invention is based upon the ability of the hydroxyl anions of an anion exchange resin containing them to be displaced by $HSS^=$ in the lean aqueous absorbent solution which thus become bonded to the resin. The present invention provides the further advantage that the anion exchange resin is used to treat the lean aqueous absorbent to avoid as much as possible the useless consumption of ion exchange capacity. This permits the more selective removal of heat stable salt anions with as little waste as possible of ion exchange capacity and regenerant costs on needless aqueous sulfur dioxide or bisulfite ion removal.

These discoveries are used by the present invention to treat a slip stream, or purge stream, of the aqueous absorbent, such as aqueous triethanolamine sulfite or bisulfite, contaminated with heat stable salts, with an anion exchange resin in the hydroxyl form after the aqueous absorbent has been used to treat gases containing sulfur dioxide which is absorbed thereby and after stripping the absorbed $SO_2$. The absorbent normally is regenerated by heating it in an evaporator or still or other suitable stripping apparatus and is recycled for further contact with the gases containing sulfur dioxide. In this way, the gases are depleted in sulfur dioxide content and sulfur dioxide is concentrated for use or disposal. However, heat stable salts and/or the divalent sulfur oxyanions thereof form in the system, or enter it with the waste gases, and, unless removed, they can build up to the point where the absorbent no longer functions efficiently and ultimately becomes incapable of absorbing sulfur dioxide.

Ion exchange has been defined as the reversible exchange of ions between a solid and a liquid in which there is no substantial change in the structure of the solid. Anion exchange resins are high molecular weight polybases containing large numbers of polar exchange groups that are chemically bound to a three-dimensional hydrocarbon network. Anion exchangers usually contain primary, secondary and/or tertiary amine groups, and/or quaternary ammonium groups. However, sulfonium anion exchangers have been made and phosphonium anion exchangers are feasible. The mode of operation of anion exchange resins is the same as a solution phase reaction, with the exception that one of the ionic species is permanently fixed to the resin bead itself, and the reaction is shifted back and fourth by strong concentration differences of the various solutions used.

The three-dimensional hydrocarbon network to which the polar exchange groups are bound usually is of a polymeric nature. Polystyrene crosslinked with divinylbenzene to provide the needed or desired dimensional stability is most frequently used although other polymeric forms, such as the acrylics and other vinyl polymers, are used or are available, for example, phenol-formaldehyde resins have been widely used. The polar groups are bonded to the resin or polymer, usually, by a procedure involving chloromethylation and amination. The physical form of the anion exchangers is preferably a bead form as is obtained by suspension or dispersion polymerization of styrene and divinylbenzene, although other particle forms are used, for example, granulated phenol-formaldehyde resins.

Commercial anion exchange resins are available in two major types, macroreticular and "gel" type. The macroreticular resins are small, tough, rigid plastic beads having large discrete pores in the range of 1300 A. Because of their large uniform pore structure, these resins are useful for the absorption and elution of high molecular weight ions and have good hydraulic characteristics. Furthermore, because of their tough structure (they have a higher degree of crosslinking), they are less susceptible to physical attrition and have a long operating life. They do, however, have somewhat lower capacity than the "gel" resins. The latter do not contain any true porosity (and usually have a much lower degree of crosslinking) and the ions to be exchanged must "diffuse" through the gel structure, thus limiting the size of the ions that can be handled. The advantage to this type of resin is its higher exchange capacity and somewhat lower capital cost.

Both of these two major types are broken down into two sub-groups: The strongly basic anion exchangers with quaternary ammonium functionality and the weakly basic anion exchangers with polyamine functionality. The strong base resins offer much better removal of anions in the exhaustion step whereas the weak base resins offer greater ease of regeneration.

Suitable anion exchange resins for use in this invention include the strong base and weak base anion exchange resins capable of containing bisulfite anions as the anion component. Preferred anion exchange resins are the styrene-divinylbenzene copolymers, usually in bead form. The strong base exchangers have quaternary ammonium functionality and are preferred. Macroreticular strong base anion exchange resins, which are especially preferred, are commercially available, for example from Rohm and Haas as Amberlite IRA-900, IRA-900C, IRA-904, IRA-910, IRA-911, and IRA-938. Gel-type strong base ion exchangers that can be used include Rohm and Haas' Amberlites IRA-400, IRA-400C, IRA-401S, IRA-402, IRA-410, IRA-425 and IRA-458 and Stratabed 402.

The weak base anion exchangers, i.e., those having polyamine functionality can also be used in this invention and these include Rohm and Haas' macroreticular Amberlite IRA-93 and Stratabed 93 and from Dow Chemical Company as Dowex 3 and Dowex WGR. Gel-type weak base anion exchange resins, which can be used herein, are also commercially available from Rohm and Haas as Amberlites IR-45, IR-47 and IR-68 and are also available from Dow. Any of the weak base or strong base anion exchange resins described in "Ion Exchange Technology", F. C. Nachod and J. Schubert, Editors, Academic Press, New York, 1956, and "Ion Exchange Resins", Robert Kunin, Robert E. Krieger Publishing Company, Huntington, N.Y., 1972, can be used.

In summary, the operation of an ion exchange resin bed typically consists of the following steps: (1) Backwashing, (2) Regeneration, and (3) Exhaustion, which are preferably used in this invention.

1. Backwashing—This is accomplished by reversing the flow of liquid (usually water) through the column. This step rinses out any sediment trapped among the resin beads and it allows the beads to re-settle, thus alleviating any pressure built up in the column due to expansion and contraction of the resin.

2. Regeneration—The regeneration is simply a reverse shift in the reaction equilibrium due to the passage of a suitable concentrated ionic specie through the resin. As an example, assume the resin is in the heat stable salt form, represented by $(R^+)_2HSS^=$, and it is being regenerated to the hydroxyl form, $R^+OH^-$, with a concentrated caustic solution. This can be represented by the following equilibrium reaction:

$$(R^+)_2HSS^= + 2NaOH \rightleftharpoons 2R^+OH^- + Na_2HSS.$$

3. Exhaustion—This is the part of the cycle where the unwanted anions, such as $HSS^=$, are removed from the solution and replaced with acceptable anions from the resin. In the case of triethanolamine (TEA) solvent system, this can be represented as follows:

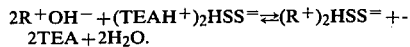

$$2R^+OH^- + (TEAH^+)_2HSS^= \rightleftharpoons (R^+)_2HSS^= + 2TEA + 2H_2O.$$

A rinse step is used to wash the excess regenerant (e.g., NaOH or other inorganic hydroxide) from the resin after the regeneration step. This usually requires large quantities of water which are disposed of by appropriate means as described herein. A rinse step is also used after the exhaustion step to minimize loss of absorbent which is recovered in the rinse waters.

A single bed or column of anion exchanger or a plurality of beds or columns thereof can be used. Each bed, of course, must be taken out of service periodically for regeneration. If one bed is used, the purge stream is continuously removed and stored while reclaimed absorbent (reclaimed by previous anion exchange resin treatment) is fed back into the system as make-up. Periodically, for example once a day, the stored purge stream is reclaimed and the reclaimed absorbent is stored and gradually fed back into the system to continuously make up for the purge stream continuously removed. After the stored purge stream has been reclaimed by anion exchange treatment there remains ample time for the regeneration of the bed before the next reclamation operation.

For continuous anion exchange operation, it is necessary to have at least two anion exchange resins beds, one or more in anion exchange operation reclaiming absorbent while one other is being regenerated. The use of multiple ion exchange resin columns or beds joined in series is preferred and it is most preferred to have four series-connected beds in anion exchange operation while one or more others are being regenerated. By series connection, is meant that the output of the first bed is fed as input to the second bed, the output of the second bed is fed as inut to the third bed and the output of the third bed is fed as input to the fourth bed. The input to the first bed, of course, is the aqueous absorbent purge stream and the output of the fourth bed is returned to service in the absorption of $SO_2$ from the waste gas.

The ion exchange resin beds or columns are operated under the best conditions for ion exchange. Ambient temperatures and pressures are usually acceptable, for example, room temperature and existing pressure of the atmosphere can be used. The fluids coming into contact with the beds or columns can be preheated or precooled as desired or necessary to provide the desired contact temperatures.

It is important that the absorbent purge stream and wash, rinse and regeneration fluids passed through the anion exchange resin bed or column be of sufficiently low density and viscosity so as not to float off the resin or otherwise disrupt the bed. The densities and viscosities of fluids coming into contact with the bed can be lowered by dilution with water. For example, the incoming absorbent purge stream if of too high a density or viscosity can be diluted with water, for example, the wash water obtained by washing the bed or column with water after contact with the absorbent purge stream. Usually the density of the purge stream, regenerant and wash waters should be kept below 1.05 g/cc which is below the normal density of the anion exchange resins.

Since each stream that is passed through the ion exchange bed is preferably followed by a water wash step to prevent cross contamination of process streams, there is a substantial quantity of more or less contaminated waste streams. However, this difficulty is readily overcome. For instance, in regenerating the exhausted resin bed with sodium hydroxide there is first displaced a free column volume of virtually pure water which can be returned to the water reservoir or used elsewhere in the process. The tail cut from the caustic stream contains almost pure aqueous sodium hydroxide (with traces of bisulfite and heat stable salts) and can be returned to the sodium hydroxide reservoir in which extraneous salts reach a small and wholly innocuous steady state concentration. The absorbent stream containing heat stable salts again displaces a column volume of virtually pure water which again is returned to the water reservoir for subsequent resin washing or otherwise employed in the process. The remainder of the absorbent stream, now depleted in heat stable salts, is returned to the absorption-stripping cycle of the process.

The present invention is advantageously applied to a continuous process for the selective removal of sulfur dioxide with respect to carbon dioxide from a gas mixture such as a waste combustion gas containing same wherein the gas mixture is contacted with a mainstream of an aqueous absorbent solution to remove sulfur dioxide from the gas mixture and form a mainstream of rich aqueous absorbent solution enriched in sulfur dioxide removed from the gas mixture; the mainstream of the rich aqueous absorbent solution is moved to a stripping zone where it is stripped of sulfur dioxide to form a mainstream of lean aqueous absorbent solution depleted in sulfur dioxide content; and the mainstream of the lean aqueous absorbent solution is recycled and re-contacted with the gas mixture in the absorbing zone. The improvement of this invention is employed in this context for removing divalent sulfur oxyanions of heat stable salts which accumulate in the absorbent solution by separating a portion of the aqueous absorbent solution containing the divalent sulfur oxyanions of heat stable salts in a slip stream or purge stream from the lean mainstreams, contacting the slip stream with an anion exchange resin having hydroxyl anions displaceable by the divalent sulfur oxyanions of the heat stable salts to remove same from the separated slip stream whereby the hydroxyl anions of the resin are replaced by the divalent sulfur oxyanions of the heat stable salts; returning the separated slip stream after contact with the anion exchange resin to one of the mainstreams, and regenerating the anion exchange resin by contacting it with aqueous inorganic hydroxide, such as the alkali metal hydroxides including sodium hydroxide and potassium hydroxide to replace the divalent sulfur oxyanions of the heat stable salts on said resin with hydroxyl anions thereby forming a waste stream containing the divalent sulfur oxyanions of the heat stable salts.

It has been discovered that whereas most organic bases are not good absorbents for $SO_2$ absorption, aqueous solutions of many of their sulfite salts are. In particular, the sulfite salts of alkanolamines in general, and especially triethanolamine sulfite, are good absorbents. As shown by U.S. Pat. No. 3,904,735, if excess stripping of the absorbent is avoided, an aqueous solution of triethanolamine sulfite is indeed being used as the absorbent. It has now been discovered, that, although most organic bases are too strong to selectively absorb $SO_2$ in preference to $CO_2$, their soluble sulfites and, in particular, all of the alkanolamine sulfites are suitable absorbents which are selective to $SO_2$ absorption as opposed to $CO_2$ absorption. Kinetic factors make the absorbent appear difficult to strip and increase its "apparent" basicity. In truth, the basicities of these organic solvents in the sulfite form are about the same exhibiting a pH range of 5–7.5 in the useful loading range of 0.55–0.95 mols $SO_2$ per mol base. The pH of sodium sulfite is slightly lower, a reflection of the limited aqueous solubility of $Na_2SO_3$, and an indication that a lower absorption efficiency could be expected. This is significant in that processes have been suggested for the use of $Na_2SO_3$ for stack gas scrubbing as discussed hereinabove.

The tri- and tetra-alkanolamines, such as those disclosed by U.S. Pat. No. 3,904,735 are further preferred because they are higher boiling, e.g., less volatile than other alkanolamines and less likely to be lost by evaporation into the stack gas. In addition, the higher hydroxyl functionality acts to inhibit the oxidation of $SO_2$ to $SO_3$ in the absorber. It has been found that the oxidation rate is lower for the higher hydroxyl functionality, and is highest for the inorganic sodium sulfite. Accordingly, whereas all alkanolamine sulfites can be used, di-, tri- or tetrahydroxyl functionality is preferred, and triethanolamine sulfite is an especially preferred absorbent.

The aqueous absorbent solution can contain about 5 to about 50 wt.% water, preferably about 10 to about 40 wt.% water. Higher and lower amounts can be used, if desired.

The volume fraction of the circulating absorbent (in the absorption-stripping cycle) which is diverted to the absorbent reclamation step is directly proportional to the rate of HSS generation and absorption in the circulating absorbent and inversely proportional to (a) the desired ratio of HSS to active absorbent tolerable or acceptable in the circulating absorbent and (b) to the fraction of the HSS present in the slip stream which is removed for reclamation. The volume fraction of the circulating absorbent diverted as the slip or purge stream to the absorbent reclamation step (i.e., contact with the anion exchange resin) is about 2 to about 20 volume percent, preferably about 5 to about 8 volume percent, and can be more or less depending upon particular conditions. It is preferred to maintain the volume fraction of circulating absorbent diverted as the slip or purge stream as low as possible to minimize absorbent losses in the wash water of the resin regeneration step not recirculated to the purge stream for density adjustment. It is desirable, of course, to conduct the overall process in such a manner that HSS formation and accumulation is minimized.

It is preferred to remove for reclamation a purge stream from the lean absorbent stream on its way from the stripper to the absorber because it is desirable to use the capacity of the ion exchange resin for picking up the heat stable salt content of the purge stream and not the sulfur dioxide content of the purge stream. A particularly advantageous procedure in some instances is to take a purge stream of the rich absorbent coming from the absorber and to contact it with incoming waste gas before sending it to the ion exchange resin. In this way the incoming waste gas is quenched to a more desirable absorption temperature and humidified or dehumidified to the desired moisture content while the absorbent purge stream picks up sulfur trioxide and acid mist from the waste gas to reduce the formation and accumulation of heat stable salts in the absorption-stripping cycle and, at the same time, gives up some of its sulfur dioxide content to the waste gas for removal and concentration in the absorption-stripping cycle.

Because ion exchange resins require periodic regeneration, there results normally an effluent stream of dilute salts which itself could be a pollutant if disposed of in an arbitrary manner. A novel way has been found to avoid this by utilizing the effluent to provide steam for use in the solvent regeneration step of this process. Accordingly, this invention has interlocked the solvent reclaiming and resin regeneration steps in a unique manner.

Specifically, the waste stream produced by treating the exhausted anion exchange resin (loaded with heat stable anions) with inorganic hydroxide contains the heat stable salt anions, water, some inorganic cations (e.g. $Na^+$) and some $SO_2$. It is preferred to recover the water and, at the same time, to further concentrate the waste stream containing the $HSS^=$ to simplify disposal thereof. This can be accomplished by contacting the incoming waste gas with the waste stream whereupon sulfur trioxide and acid mist are absorbed in the waste stream and $SO_2$ is displaced to the waste gas. In addition, or alternatively, the waste stream can be heated in an evaporator or a stripper to drive off water as steam which can be used in the absorbent stripper as a source of heat and the condensate of which can be re-used in the resin regeneration procedure.

The prior art appears to teach that a stripping tower having multiple stages should be used to regenerate the absorbent by driving off the $SO_2$ to provide ample contact staging. It has been found, however, that high liquid residence time of the absorbent being regenerated is more important than the contact staging and that the regeneration can be carried out in a simple still or evaporator, provided it is designed for an ample amount of liquid residence time. It appears as though the desorption of $SO_2$ in a sulfite solvent is a kinetically hindered process. Accordingly, attempts to strip rapidly, even at excessive temperatures, and with gross excesses of stripping steam, will fail. It normally would be concluded that more stages were needed. It has been now discovered that increasing the size of a single stage boiler or evaporator which increases the hold-up time, i.e., residence time to about 7 to about 20 minutes, preferably 10 to 15 minutes, made regeneration possible with minimum quantities of stripping steam (e.g., 7 lbs. steam/lb. $SO_2$) and at reasonable temperatures (e.g., as low as 80° C.). To illustrate this important discovery reference is made to FIG. 1 which is a plot of stripping steam requirements vs. residence time for a simple pot type boiler at 90° C. and 100 mm Hg wherein the average loading of rich aqueous TEA absorbent was 0.87 mol $SO_2$ per mol TEA sulfite, that of the lean aqueous TEA absorbent was 0.34 mol $SO_2$ per mol TEA sulfite and the average water in the lean absorbent was about 8.7 wt.%. The overall relationship is quite clear that by increasing the residence time the amount of required stripping steam is indeed reduced.

It is, therefore, preferred to increase the residence time of the rich absorbent in the absorbent stripper as much as practical. However, inasmuch as an increase in residence time also increases heat stable salts formation, the residence time should not be increased to such an extent that excessive amounts of HSS are formed. This can be done in a number of ways one of which, as mentioned above, is to enlarge the stripper boiler or evaporator to provide a high holdup to throughput ratio. Another way of increasing residence time is to use conventionally sized equipment (for example, a falling film evaporator which itself has very low holdup and, hence, provides little residence time) and to recirculate the absorbent being stripped through an external circulation loop containing an amply sized reservoir so that the total holdup time in the stripper and its circulation loop is adequate to provide the desired high residence time, for example of 10 to 15 minutes.

It also has been found that with an 80°–90° C. stripping temperature, the quantity of $SO_2$ disproportionation products produced is reduced to only a fraction of that produced at 100°–125° C. stripping and, accordingly, the lower stripping temperature puts less load on the ion exchange resin. For this reason, it is preferred that the stripping temperature should not exceed 100° C.

There are many variations of the steps of the process described above which do not change the essential nature of the invention described and claimed herein. One such variation would be to introduce the bulk of the stripped absorbent from the stripper into the absorber at one stage below the top and to introduce the reclaimed portion of absorbent coming from the ion exchange resin step to the top stage of the absorber. In this way, the reclaimed absorbent, which is much leaner than the stripped absorbent, would be able to more effectively remove $SO_2$ at the small concentrations existing in the waste gas at the top of the absorber, permitting a more efficient clean-up of the gas.

DESCRIPTION OF SPECIFIC EMBODIMENTS

Figure 1:
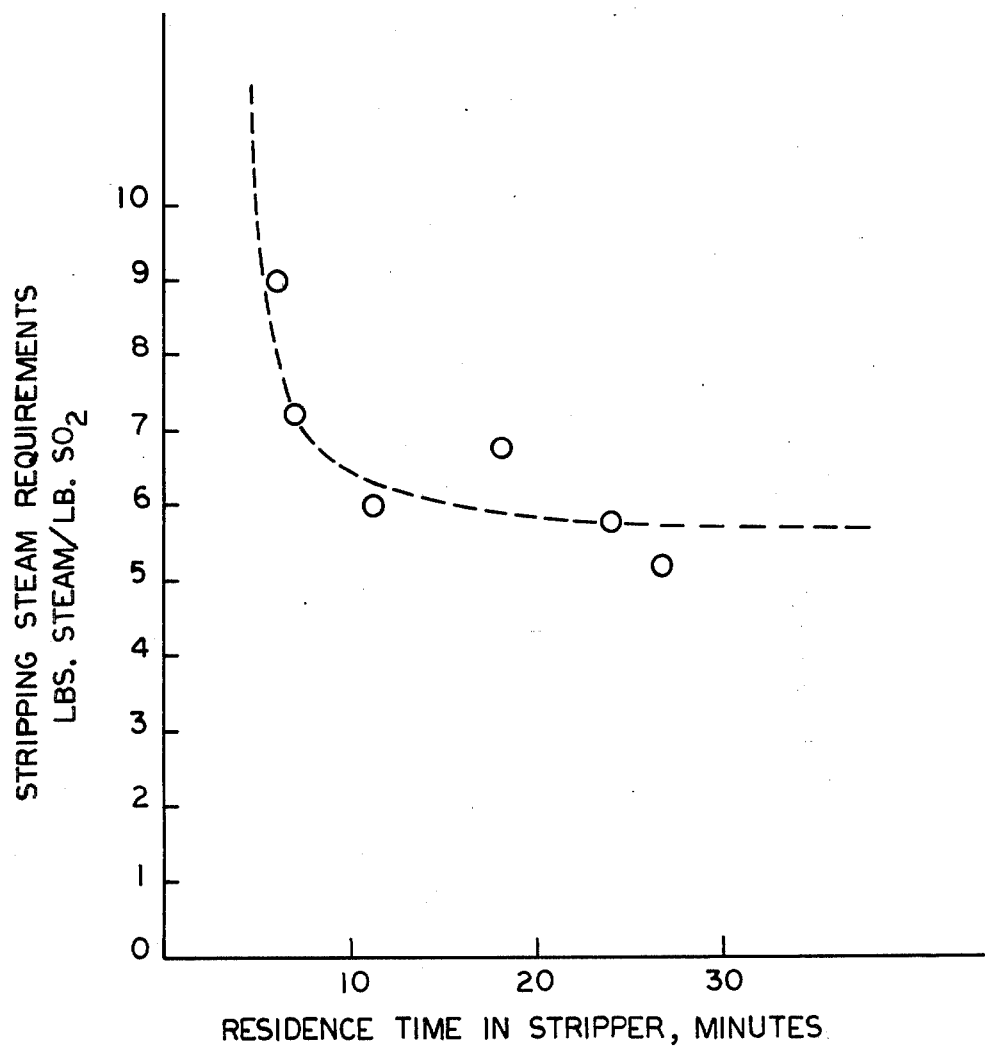
FIG. 1 is a plot of stripping steam requirements versus residence time in the stripper for a rich $SO_2$-laden aqueous absorbent having an average loading of 0.87 mol $SO_2$ per mol of triethanolamine sulfite, and a lean aqueous absorbent having an average loading of 0.34 mol $SO_2$ per mol of triethanolamine sulfite and having an average water content of about 8.7 wt.% (in the lean absorbent)

In one embodiment the invention comprises an improvement process for the removal of sulfur dioxide from an effluent gas stream (power plant stack gas or the like) by means of selective absorption in an aqueous solution oa an organic base sulfite, preferably an alkanolamine sulfite and especially preferably triethanolamine sulfite, comprising about 50–90 wt. percent of the organic sulfite, about 10–40 wt. percent water, and some quantities (about 5–30 wt. percent) of recirculated heat stable $SO_2$ side reaction products, i.e., heat stable salts. The improved process in one full embodiment comprises the steps of (a) absorption by countercurrent contact in an absorption tower, for example, containing the equivalent of three (3) or more stages, such absorption being carried out near atmospheric pressure (or above if the feed gas is so available), and at about 20° to about 70° C.;

(b) desorption of the $SO_2$ from the absorbent by steam stripping in a single stage still or evaporator providing a liquid residence time of about 3 to about 30 minutes, preferably about 10 to about 15 minutes and operated at a reduced pressure of about 50 to about 350 mm Hg, preferably about 100 to about 150 mm Hg and a temperature of about 80° to about 100° C.;

(c) removing the $SO_2$ overhead from step (b), condensing the water therefrom, and compressing the $SO_2$ to atmospheric pressure or above for further use or storage;

(d) recirculating the bulk of the stripped absorbent back to the absorber;

(e) removing from the stripped absorbent a purge stream of about 2 to about 20 wt. percent, preferably about 5 to about 8 wt. percent, for reclaiming with respect to heat stable salts, reclaiming this purge stream via passage through an anion exchange resin and returning the reclaimed absorbent, including resin bed washings, to the top of the absorber;

(f) regenerating the anion exchange resin with, for example, an aqueous solution of sodium hydroxide, taking the effluent, including resin bed washings, to a boiler and boiling to concentrate the salts to a slurry of about 30 to about 70 wt. percent solids, and to provide about 15 to about 30 lbs. steam;

(g) using the steam generated in step (f) for at least part of that required in the stripping step (b), either by direct introduction into the still or evaporator or indirectly via heat exchange, and using part or all of the condensate therefrom to provide water for further use in the ion exchange step, both for the dissolution of the sodium hydroxide (caustic) and for resin bed washing.

Temperatures and pressures above and below those specified in the above steps can be employed if desirable or advantageous.

The following examples are presented. In the examples, the following designations have the meanings given below:

| | |
|---|---|
| cc | cubic centimeter |
| g | grams |
| wt. % | weight percent |
| ppm | parts per million based on weight |
| ppmv | parts per million based on volume |
| M lb mols | thousand pound mols |
| LTPD | long tons per day |
| M. Wt. | molecular weight |
| M | Molar |
| meq | milliequivalent |
| ml | milliliter |
| MSCFM | thousand standard cubic feet per minute |
| MMSCFD | million standard cubic feet per day |
| psia | pounds per square inch absolute |
| psig | pounds per square inch gauge |
| TEA | triethanolamine |
| HSS | heat stable salts having divalent sulfur oxyanions, e.g., $SO_4^=$, $S_2O_3^=$, $S_xO_6^=$ and the like, as described hereinabove. |

Also, unless otherwise specified all parts and percentages are on a weight basis, and all temperatures are on the Fahrenheit scale.

EXAMPLE 1

Figure 2:
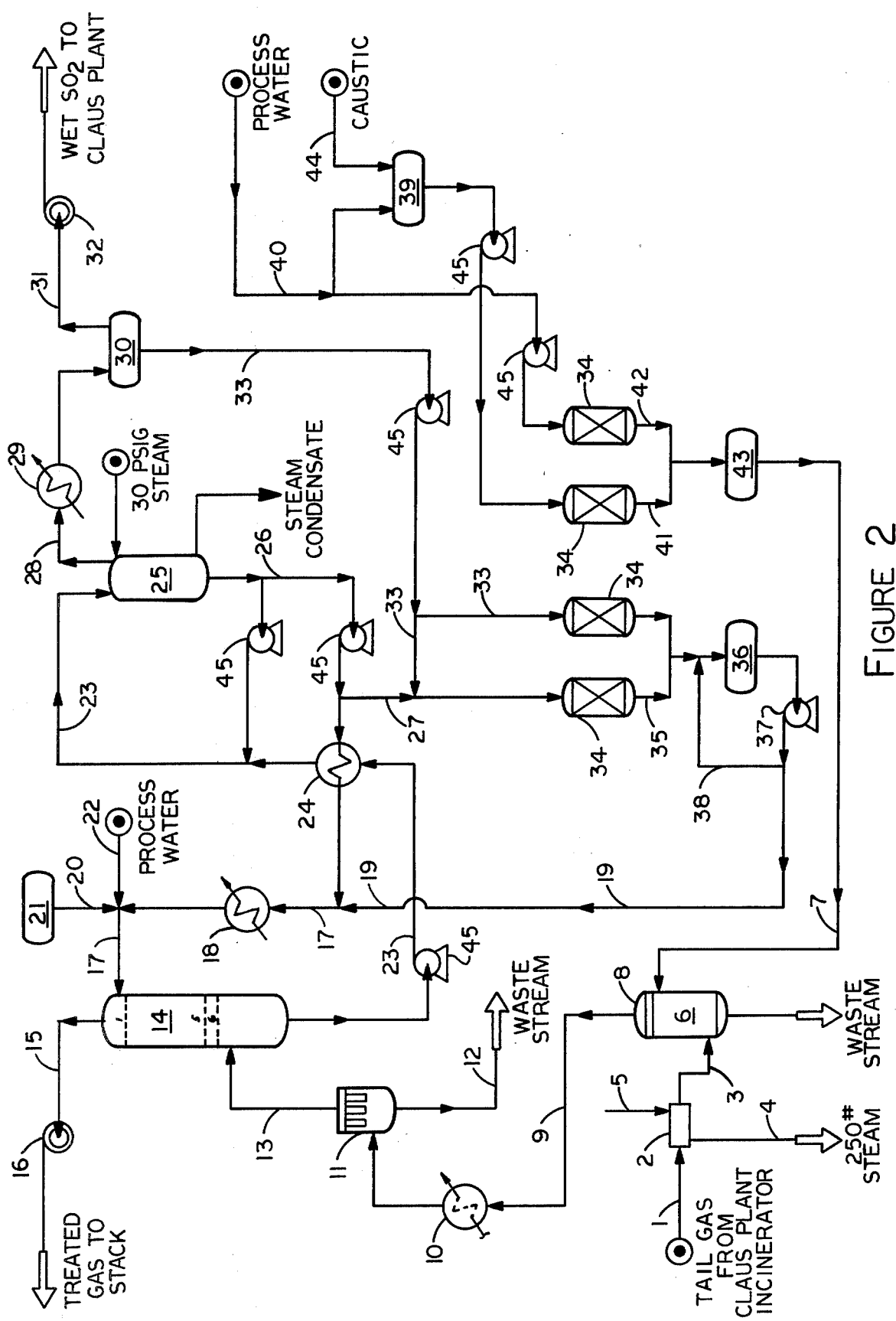
FIG. 2 is a flow diagram illustrating one embodiment of this invention wherein the tail gas from the incinerator of a Claus plant is treated to remove and concentrate $SO_2$ contained thereby.

FIG. 2 illustrates a unit and process for treating the tail gas effluent from a typical three-stage Claus plant producing 280 LTPD sulfur at 96% efficiency. The composition and conditions of the feed gas before and after incineration are given in Table I. The treated gas vented by stack has $SO_2$ and $SO_3$ concentrations less than 500 and 15 ppmv, respectively. The moisture level is about 100° F. dew point.

The purpose of the gas pretreatment section is to provide an absorber feed gas at 100° F. containing minimal $SO_3$ and $H_2SO_4$ mist. A stream 1 of tail gas from the Claus plant incinerator enters a waste heat boiler 2 at 100° F. and exits through stream 3 at 600° F. producing 250 psi steam in line 4 from water entering the boiler 2 through line 5. The exit temperature of stream 3 is well above the 500° F. dew point of $H_2SO_4$ thus avoiding acid condensation which would create a difficult corrosion problem. The gas is then quenched in quench tower 6 with an alkaline waste-water stream 7 (produced as described hereinafter) to remove $SO_3$. The liquid and gas are separated in an $SO_3$ knock-out drum 8 at the top of the quench tower 6.

The quenched gas stream 9 is cooled to 100° F. (20° F. below the absorber temperature) in the feed cooler 10 using cooling tower water. Condensation is removed in a high-efficiency demister 11 and is disposed of through waste stream 12. This step is necessary to minimize the carryover of sulfuric acid mist to the absorber.

The cool gas stream 13 enters the base of a six-tray absorber 14 where it countercurrently contacts the absorbent, TEA. The $SO_2$ content of the gas is reduced from about 10,500 to <500 ppmv (more or less depending on pollution regulations). The treated gas stream 15 leaving the top of the absorber has a 100° F. dew point. It is sent to an induced draft blower 16 and then to the stack. The treated gas can be reheated with the incinerator tail gas stream 1 in a regenerative heat exchanger if required to control pluming and ensure buoyancy.

TABLE I

| Feed Specifications | Claus Tail Effluent | After Incineration And Cooling To 100° F. |
|---|---|---|
| Feedrate, MSCFM | 18.338 | 16.2 (at 100° F.) |
| Feedrate, MMSCFD | 26.407 | 23.3 (at 100° F.) |
| Pressure, psia | 17.7 | |
| Temperature, °F. | 280 | |
| Density, lbs/cu.ft. | 0.0558 | |
| Molecular Weight | 25.05 | |
| LTPD of sulfur | 10 | |

| FEED GAS COMPOSITION AND CONDITIONS | | | | | |
|---|---|---|---|---|---|
| | | Claus Tail Gas Effluent | | After Incineration and Cooling to 100°0 F. | |
| Compositon | M. Wt. | Lb moles/hr. | Mole % | Lb moles/hr. | Mole % |
| $H_2S$ | 34 | 13.2 | 0.45 | — | — |
| $SO_2$ | 64 | 6.6 | 0.23 | 26.5 | 1.03 |
| $SO_3$ | 80 | — | — | 2.4 | 0.09 |
| COS | 60 | 2.1 | 0.07 | — | — |
| $CS_2$ | 76 | 1.1 | 0.04 | — | — |
| $S_8$ | 256 | 0.6 0.02 | — | — | — |
| $N_2$ | 28 | 1,697.8 | 58.56 | 2,174.1 | 84.68 |
| $H_2O$ | 18 | 1,001.6 | 34.54 | 128 | 4.99 |
| $CO_2$ | 44 | 96.2 | 3.32 | 168.8 | 6.58 |
| CO | 28 | 47.8 | 1.65 | — | — |
| $O_2$ | 32 | — | — | 63.8 | 2.49 |
| $H_2$ | 2 | 28.6 | 0.99 | — | — |
| $NO_x$ | 53 | 3.7 | 0.13 | 3.7 | 0.14 |
| Total | | 2,899.3 | 100. | 2,567.3 | 100. |

Lean absorbent stream 17, which has been cooled to 120° F. by cooler 18 and to which regenerated absorbent stream 19 and make-up absorbent stream 20 from make-up reservoir 21 and water stream 22 have been added, is fed into the top of the absorber 14. It passes downward, countercurrent to the gas stream, absorbing $SO_2$. The rich absorbent stream 23 exits the bottom of the absorber 14 and is heated to about 160° F. in heat exchanger 24 by the lean absorbent stream 17 which is cooled to about 150° F. The rich absorbent stream 23 then enters the absorbent stripper 25 where water and $SO_2$ are evaporated at low pressure and moderate temperature. Stripper 25 is a falling-film type evaporator with indirect steam heating. The lean absorbent stream 26 is sent back to the absorber 14 via exchanger 24 and cooler 18, while a purge stream 27 is sent to regeneration for $HSS^=$ removal (to be described hereinafter). The stripper overhead stream 28 which is laden with water, is condensed in condenser 29 and separated in separator 30. The wet $SO_2$ vapor stream 31 from the separator 30 is pumped by vacuum compressor 32 to the Claus plant. The condensed water stream 33 is sent to the ion exchange regeneration system to be hereinafter described and/or to the purge stream 27.

The purge stream 27 of the circulating absorbent is treated by Amberlite IRA-910, a strong base anion exchange resin, to remove sulfate and any HSS buildup in the system. The resin unit comprises four beds 34 operated on a four-hour total cycle of four equal time steps each comprising: 1. Absorbent exchange, 2. Absorbent displacement by water, 3. Regeneration by caustic, and 4. Caustic displacement by water.

The purge stream 27 is diluted with stripper overhead condensate 33 to reduce its density and viscosity for easier flow through the ion exchange beds 34 to avoid bed disruption. The diluted purge stream 27 is then passed through an ion exchange bed 34 to remove 80% of the HSS, 65% of the $SO_2$ present and thus regenerate 80% of the TEA. The regenerated absorbent stream 19

EXAMPLE 2

Figure 3:
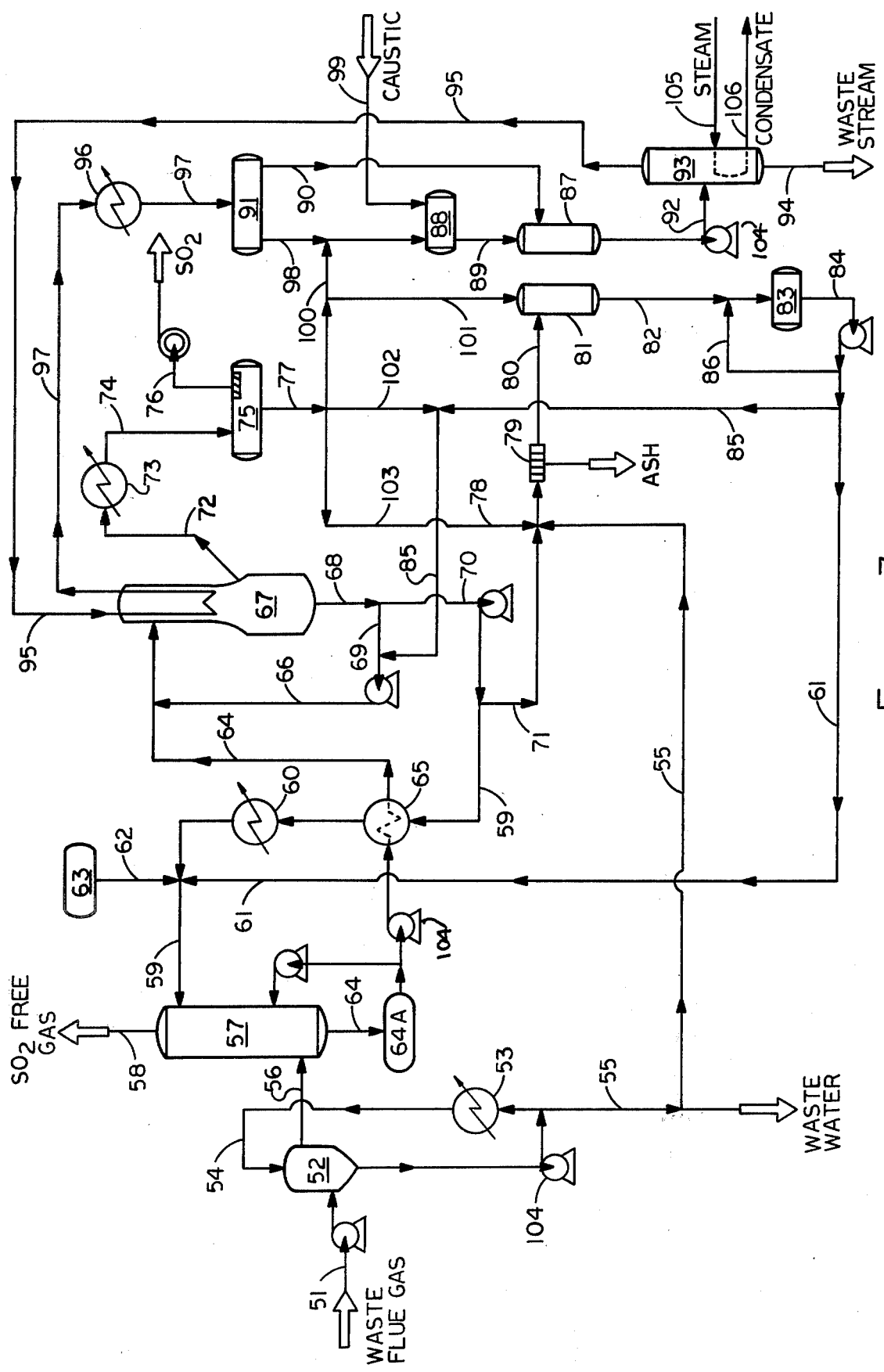
FIG. 3 is a flow diagram illustrating another embodiment of the invention wherein waste flue gases from an 800 megawatt power plant burning coal containing 3 wt.% sulfur are treated according to this invention.

FIG. 3 represents the process of this invention applied to flue gas of an 800 megawatt power plant burning coal containing 3 wt.% sulfur. The flue gas feed, which has been passed through an economizer (not shown), and from which 99% of the fly ash has been mechanically removed, is represented by stream 51, which typically consists of about 243 M lb mols/hr of gas at about 150° C. having the composition given in Table II which also gives the approximate compositions of the process streams hereinafter described.

TABLE II

| | | Flow given in 1000 pound mols/hour | | | | | | | | |
|---|---|---|---|---|---|---|---|---|---|---|
| Stream No. | Description | Total Flow | Inerts $N_2, O_2$, CO, $CO_2$ NO | $NO_2$ | Heat Stable Salts* | $SO_2$ | $H_2O$ | TEA | NaOH or Equivalent as Salt | Temp. °C. |
| 51 | Flue Gas Feed | 243 | 228 | 0.01 | 0.01 | 0.48 | 14.6 | — | — | 149 |
| 56 | Gas to Absorber | 237 | 228 | 0.01 | 0.01 | 0.48 | 8.1 | — | — | 37 |
| 58 | Absorber Vent | 236 | 228 | 0.008 | — | 0.02 | 8.1 | — | — | 37 |
| 59 | Lean Absorbent to Absorber | 9.88 | — | — | 0.25 | 0.92 | 6.67 | 2.04 | — | 37 |
| 64 | Rich Absorbent to Stripper | 10.35 | — | 0.002 | 0.26 | 1.38 | 6.67 | 2.04 | — | 37 |
| 70 | Lean Absorbent from Stripper | 5.46 | — | 0.002 | 0.265 | 0.95 | 2.20 | 2.04 | — | 90 |
| 71 | Purge Stream | 0.39 | — | 0.002 | 0.0188 | 0.067 | 0.156 | 0.145 | — | 90 |
| 80 | Diluted Purge Stream to Ion Exchange | 2.14 | — | 0.002 | 0.0188 | 0.070 | 1.906 | 0.145 | — | 20 |
| 82 | Regenerated Absorbent from Ion Exchange** | 6.38 | — | — | 0.0038 | 0.031 | 6.21 | 0.137 | — | 20 |
| 61 | Regenerated Absorbent to Absorber++ | 4.75 | — | — | 0.0028 | 0.023 | 4.63 | 0.102 | — | 20 |
| 98 | Caustic to Ion Exchange | 0.125 | — | — | — | — | — | — | 0.125 | 20 |
| 92 | Waste Stream from Ion Exchange | 11.30 | — | 0.002 | 0.015 | 0.046 | 11.10 | 0.0077 | 0.125 | 20 |
| 94 | Waste Stream from $H_2O$ Stripper | 0.90 | — | 0.002 | 0.015 | 0.046 | 0.70 | 0.0077 | 0.125 | 125 |

*$SO_4^=$, $S_2O_3^=$ and $S_xO_6^=$ calculated as their anions
**Includes ion exchange water wash
++Balance of (82) sent to stripper via 85 is returned to the absorber 14. Because the output from resin bed 34 is necessarily intermittent and because the water content will vary, a surge vessel 36 and a circulating pump 37 are provided to induce mixing via recycle loop 38.

While one ion exchange bed 34 is used for absorbent reclaiming, the others are regenerated by a three-step process which consists of:

(1) Water washing with condensate stream 33 to displace the absorbent from the bed 34. This water effluent is combined with the reclaimed absorbent in surge vessel 36 and mixed via the recycle loop 38.

(2) Regenerating the bed 34 with a 10 wt.% sodium hydroxide solution from sodium hydroxide reservoir 39 and (3) Water washing the bed 34 with process water stream 40 to displace and wash out excess caustic.

The alkaline effluent streams 41 and 42 from steps (2) and (3), respectively, are used in the quench tower 6. An alkaline effluent surge tank 43 is provided to accommodate the intermittent nature of effluent streams 41 and 42. Make-up sodium hydroxide is supplied through line 44. Circulating pumps 45 are provided at appropriate locations to provide adequate circulation.

Stream 51 can be cooled and dried via quench tower 52, in which a portion of the water condensate is recirculated through cooler 53 and reintroduced to the top of the tower as stream 54 as the quench media. Excess water stream 55, containing most of the remaining fly ash, is used in the hereinafter-described absorbent reclaiming step or sent to waste, e.g., an ash pond or pile.

The resulting cool gas stream 56, at 37° C., enters the base of absorber 57 wherein it flows countercurrent to the downcoming absorbent TEA, and its $SO_2$ content is reduced from about 2000 ppm to about 100 ppm (more or less as is required to meet pollution restrictions). It exits as gas stream 58 from the top of the absorber 57 and is sent to the stack (not shown) with or without an intermediate reheating step as may be desired.

Recycle lean absorbent stream 59 from the absorbent stripper 67 is cooled to 37° C. by cooler 60 and has added to it a reclaimed absorbent stream 61 and any necessary makeup absorbent through stream 62 from makeup absorbent reservoir 63. Lean absorbent stream 59 is fed into the top of the absorber 57 and passes downward, countercurrent to the gas stream, during which time it picks up $SO_2$ from the gas stream, increasing its loading from 0.2 to 0.8 mol $SO_2$ per mol of triethanolamine sulfite. It exits the bottom of the absorber 57 as rich absorbent stream 64 into a reservoir 64A from which it is passed through the heat exchanger 65 where it is heated by the stripped lean absorbent stream 59 to about 75° C., the lean stream 59 being simultaneously cooled from about 90° C. to about 55° C.

The heated rich absorbent stream 64 is joined by stripper recycle stream 66 and enters the absorbent thin film evaporator, where water and $SO_2$ are evaporated at 100 mm Hg and 90° C. in a ratio of 7 lbs. $H_2O$ per lb. $SO_2$. The lean absorbent effluent stream 68 exits the reservoir of the stripper 67 and 90% by volume is recycled via stream 69 back to the stripper 67. Most of the remaining exit stream 70 from stripper 67 is sent via stream 59 back to the absorber 57 via the heat exchanger 65 and cooler 60, while a 7% (by volume of the remaining exit stream 70) purge stream 71 is removed for reclaiming with respect to heat stable salts.

The $H_2O/SO_2$ overhead stream 72 from the stripper 67 passes through condenser 73 and thence via stream 74 into separator 75 from which the $SO_2$ can be pumped via line 76 to storage or any desired chemical treatment step. The water condensate stream 77 from the separator is used in the hereinafter-described absorbent reclaiming step.

The purge stream 71 is diluted with stripper condensate via lines 77 and 78 and quench tower condensate from stream 55, and filtered in filter 79 to remove any fly ash which may have bypassed initial mechanical removal and been entrapped either in the absorbent or the quench tower condensate. The filtrate stream 80 is passed through one of two (or more) anion exchange beds 81 containing Amberlite IRA-910 a strong base anion exchange resin to remove 90% of the heat stable anions, 70% of the $SO_2$ present as sulfite-bisulfite, and thus regenerate 80% of the TEA as a free base. The ion exchange resin bed effluent 82 containing reclaimed absorbent is passed into a reservoir 83 from which it can be returned via lines 84 and 61 to the absorber 57. A portion 85 of this stream may be sent to the stripper 67, if desired, to provide additional stripping water. Because the output from anion exchange resin bed 81 is intermittent, and because the water content will vary, it is beneficial to induce mixing in absorbent reservoir 83 via a recycle loop 86.

While one anion exchange bed 81 is used for absorbent reclaiming, another ion exchange resin bed is being regenerated by a three-step process which comprises (1) water washing with water condensate stream 77, the effluent of which is combined with the reclaimed absorbent in reservoir 83 and mixed via the recycle loop 86, (2) regeneration with 10 wt.% aqueous sodium hydroxide from holding tank 88 via line 89, and (3) water washing with steam condensate via line 90 from steam condensate reservoir 91 to remove excess sodium hydroxide from the bed. The effluents from steps (2) and (3) are sent via line 92 to water stripper 93 where the water is boiled off to leave a waste stream 94 of concentrated sodium salts of the heat stable anions. The steam from water stripper 93 can be effectively utilized via line 95 to provide the heat in the absorbent stripper 67, and the condensate therefrom can be cooled via cooler 96 and sent via line 97 to reservoir 91, from which it can be recycled as wash water for the resin bed 87 through stream 90 and/or can be sent via line 98 to the sodium hydroxide reservoir 88 to adjust the concentration of aqueous sodium hydroxide therein. Additional sodium hydroxide (caustic) is added to the reservoir 88 through line 99.

Water condensate stream 77 separated from the $SO_2$ gas emanating from the stripper 67 can be diverted to the sodium hydroxide reservoir 88, as needed, via line 100, or it can be used to wash the ion exchange resin bed 81 via line 101, or it can be diverted, as needed, via line 102 to the recycle loop 66 of the absorbent stripper 67, or it can be used via line 103 to dilute the purge stream 71 before it enters the ion exchange resin bed 81. Pumps 104 are appropriately placed to provide adequate circulation.

Steam is provided to the water stripper 93 via line 105 and condensate removed via line 106.

EXAMPLES 3 AND 4

Figure 4:
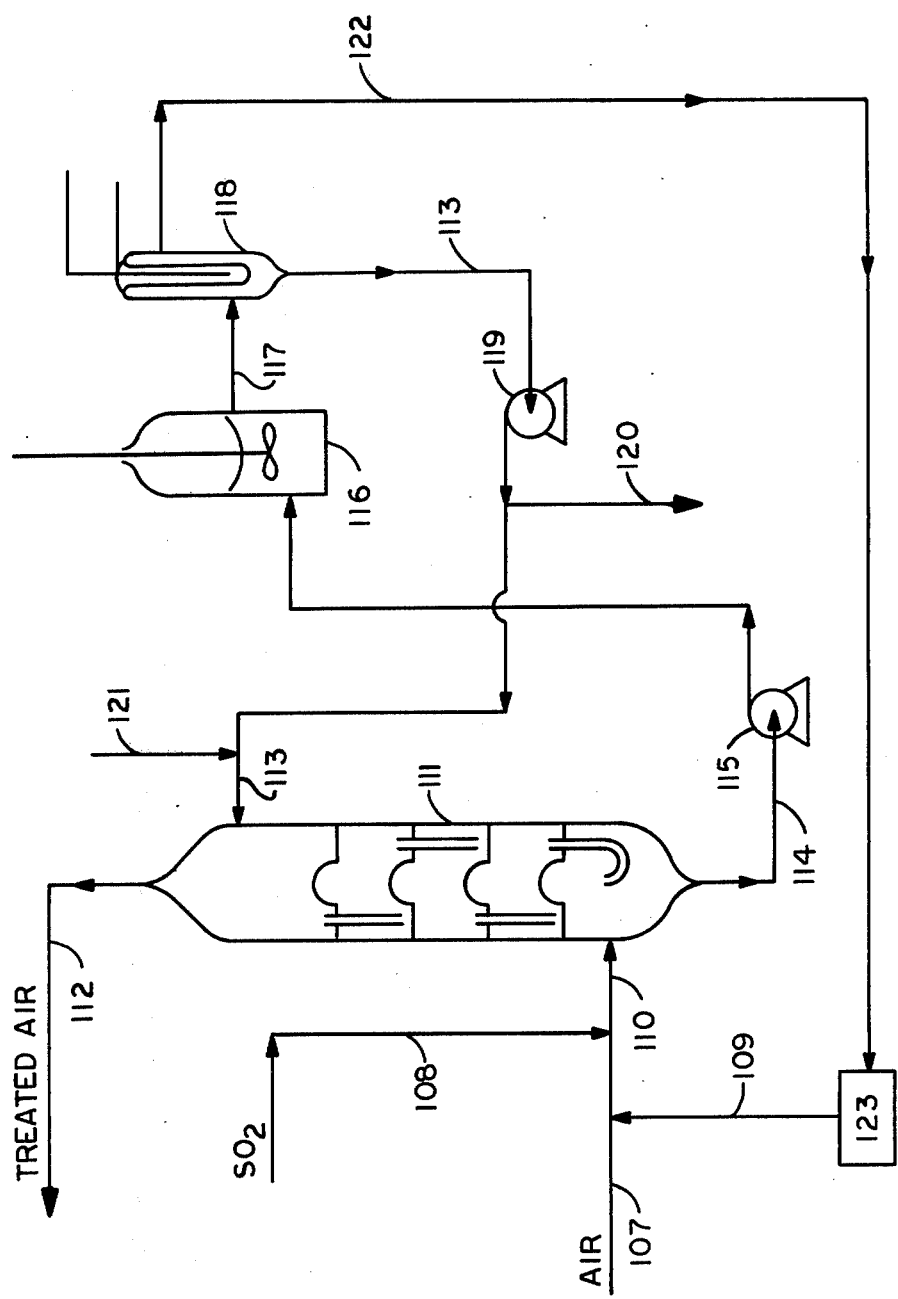
FIG. 4 is a flow diagram illustrating a laboratory simulation of the process of this invention using air and $SO_2$ as the waste gas being treated.

Referring to FIG. 4, the feed gas employed was made up of an airstream 107 to which was added sulfur dioxide initially from a suitable source via stream 108. During operation recycle sulfur dioxide was used via stream 109 with enough make up sulfur dioxide if needed from stream 108 to provide a sulfur dioxide level of 2000 to 3000 ppm. The resulting feed gas was passed via stream 110 into the bottom of a 4-stage bubble cap absorber 111, and exited the top via stream 112. Gas samples were taken at streams 110 and 112 for analyses by both the Dräger tube technique and gas chromatography.

The lean absorbent stream 113 was passed into the top of the absorber 111, and the rich stream 114 exited the bottom. The rich absorbent stream 114 was passed through a let-down valve into the vacuum portion of the stripper system and pumped by pump 115 into the stripper 116. The stripper 116 comprised a stirred steam heated pot from which both vapor and lean absorbent exited via stream 117 into the condenser 118. The water vapor was condensed in the condenser 118 and rejoined the lean absorbent stream 113 which was pumped by pump 119 out of the vacuum portion of the system and recirculated to the absorber 111. A portion of this stream 120 was withdrawn for reclaiming with respect to heat stable salts, and the absorbent volume was made up by the addition of reclaimed absorbent via line 121.

The $SO_2$ stream 122 emanating from the top of condenser 118 normally would be treated further to produce sulfuric acid or sulfur. However, it was, in this case, recirculated to the incoming air stream 107 through the vacuum pump 123.

The purge stream 120 was passed through a strong base anion exchange resin, identified as Amberlite IRA-910 which treatment removed 80% of the heat stable salts and 65% of the $SO_2$ present as sulfite or bisulfite. The resin was subsequently washed and regenerated with 10 wt.% aqueous sodium hydroxide yielding an aqueous effluent of the sodium salts of the heat stable anions. This effluent was not distilled to produce steam as it would be in an industrial application to concentrate it prior to disposal.

Operating parameters for Examples 3 and 4 are given in Table III.

Table III

| OPERATING PARAMETERS FOR EXAMPLES 3 AND 4 | | | |
|---|---|---|---|
| Stream | | Example No. | |
| No. | | 3 | 4 |
| 107 | Air Flow, liter/min | 100 | 50 |
| 110 | $SO_2$ to Absorber, ppm | 2230 | 2590 |
| 113 | Lean Absorbent Flow, g/min | 7.6 | 8.0 |
| | Lean Absorbent Composition, wt. % | | |
| | Triethanolamine sulfite | 58.9 | 56.8 |
| | Heat Stable TEA Salts | 11.7 | 20.1 |

Table III-continued

OPERATING PARAMETERS FOR EXAMPLES 3 AND 4

| Stream No. | | Example No. 3 | Example No. 4 |
|---|---|---|---|
| | Water | 26.0 | 20.0 |
| | $SO_2$ | 3.37 | 3.06 |
| | Lean Absorbent Loading, mol $SO_2$/mol $(TEAH)_2SO_3$ | 0.34 | 0.32 |
| | Absorption Temperature, °C. | 37 | 37 |
| 112 | $SO_2$ output, ppm | 460 | 200 |
| | $SO_2$ removed, % | 79 | 92 |
| | Average tray efficiency, % | 33 | 47 |
| 114 | Rich Absorbent loading, mol $SO_2$/mol $(TEAH)_2 SO_3$ | 0.86 | 0.76 |
| | Loading change | 0.52 | 0.44 |
| | Stripping pressure, mm Hg | 100 | 100 |
| | Stripping temperature, °C. | 90 | 90 |
| | Residence time in stripper, minutes | 9 | 9 |
| | Steam consumption, gms $H_2O$/gm $SO_2$ | 8.4 | 10.5 |
| | Rate of heat stable salt formation | 0.44 | 0.20 |
| 120 | Purge stream out, g/min | 0.7 | 0.2 |
| | Percent purge | 9 | 2.5 |

What is claimed is:

1. In a process for the selective removal of sulfur dioxide with respect to carbon dioxide from a gas mixture containing same wherein
   (a) said gas mixture is contacted with a mainstream of an aqueous absorbent solution to remove sulfur dioxide from said gas mixture and form a rich aqueous absorbent solution enriched in sulfur dioxide removed from the gas mixture,
   (b) a mainstream of said rich aqueous absorbent solution is moved to a stripping zone where sulfur dioxide is removed to form a lean aqueous absorbent solution depleted in sulfur dioxide content, and
   (c) a mainstream of said lean aqueous absorbent solution is recycled from the stripping zone and re-contacted with said gas mixture, the improvement comprising
   1. using an aqueous alkanolamine or sulfites thereof as the aqueous absorbent solution;
   2. performing the stripping step of step (b) so that the residence time of said aqueous absorbent solution in said stripping zone is from about 3 to about 30 minutes and said stripping zone is operated at a reduced pressure of about 50 to about 350 mm. Hg. and a temperature of about 80° to 100° C. to thereby minimize the formation of sulfate, thiosulfate and thionate anions;
   3. separating a portion of said aqueous absorbent solution containing accumulated sulfate, thiosulfate and thionate anions from said mainstream of lean aqueous absorbent;
   4. contacting said separate portion with an anion exchange resin having hydroxyl anions displaceable by said sulfate, thiosulfate and thionate anions to remove same from said portion whereby the hydroxyl anions of the resin are replaced by said sulfate, thiosulfate and thionate anions;
   5. returning said portion after contact with said anion exchange resin to one of said mainstreams; and
   6. regenerating said anion exchange resin by contacting it with aqueous alkaline inorganic hydroxide to replace the sulfate, thiosulfate and thionate anions on said resin with hydroxyl anions thereby forming a waste stream containing said sulfate, thiosulfate and thionate anions, whereby sulfate, thiosulfate and thionate anions are removed from said aqueous absorbent solution.

2. Improvement as claimed in claim 1 wherein said anion exchange resin is a strong base anion exchange resin.

3. Improvement as claimed in claim 2 wherein said aqueous alkaline inorganic hydroxide is an alkali metal hydroxide.

4. Improvement as claimed in claim 3 wherein said removed portion after step (2) is returned to step (a).

5. Improvement as claimed in claim 4 wherein said waste stream containing the sulfate, thiosulfate and thionate anions is contacted with said incoming gas mixture prior to its contact with said aqueous absorbent solution to absorb any sulfur trioxide and/or acid mist in said gas mixture.

6. Improvement as claimed in claim 4 wherein said waste stream containing the sulfate, thiosulfate and thionate anions is boiled to generate steam and a more concentrated solution of said divalent sulfur oxyanions of said heat stable salts.

7. Improvement as claimed in claim 6 wherein said steam is used in the stripping zone to heat said rich aqueous absorbent solution and strip sulfur dioxide from it.

8. Improvement as claimed in claim 1 wherein sulfur dioxide and water stripped in said stripping zone are separated and the water recovered from said stripping zone is used to wash said anion exchange resin during regeneration.

9. Improvement as claimed in claim 8 wherein said recovered water is used to dilute said separated portion of absorbent solution before contact with said anion exchange resin to lower its density to a level which will not physically disrupt said ion exchange resin.

10. Improvement as claimed in claim 4 wherein said separated portion after contact with said anion exchange resin is returned to said mainstream of rich aqueous absorbent solution moving to said stripping zone.

11. Improvement as claimed in claim 4 wherein said separated portion after contact with said anion exchange resin is returned to said mainstream of lean aqueous absorbent solution recycling for re-contact with said gas mixture.

12. Improvement as claimed in claim 4 wherein said anion exchange resin is disposed in a plurality of columns connected in series and said separated portion of said aqueous absorbent solution is first contacted with anion exchange resin in a first column and lastly contacted with anion exchange resin in a last column before returning it to one of said mainstreams.

13. Improvement as claimed in claim 12 wherein said anion exchange resin is disposed in four columns connected in series.

14. Improvement as claimed in claim 12 wherein said regenerating step (4) is carried out on said first column and a regenerated column containing anion exchange resin having hydroxide anions is added in series to said last column which thus becomes the next-to-last column and the newly added column becomes the last column.

15. Improvement as claimed in claim 1 wherein said liquid residence time is from about 10 to about 15 minutes and the pressure in the stripping zone is about 100 to about 150 mm Hg.

16. Improvement as claimed in claim 4 wherein said separated portion is about 2 to about 20 volume percent of the mainstream from which it is separated.

17. Improvement as claimed in claim 4 wherein said separated portion is about 5 to about 8 volume percent of the mainstream from which it is separated.

18. Improvement as claimed in claim 4 wherein said separated portion after contact with said anion exchange resin but before return to said mainstream is contacted with said gas mixture after said gas mixture has been contacted with said mainstream of aqueous absorbent solution in step (a).

19. Improvement as claimed in claim 1 wherein said stripping zone is provided with a reservoir and a recirculating loop including said zone and said reservoir to increase said liquid residence time.

* * * * *